US010681657B2

(12) United States Patent
Huang et al.

(10) Patent No.: US 10,681,657 B2
(45) Date of Patent: Jun. 9, 2020

(54) FRAME SYNCHRONIZATION METHOD, USER EQUIPMENT, AND BASE STATION

(71) Applicant: HUAWEI TECHNOLOGIES CO., LTD., Shenzhen, Guangdong (CN)

(72) Inventors: Huang Huang, Chengdu (CN); Yi Wang, Shanghai (CN); Lei Huang, Shanghai (CN)

(73) Assignee: Huawei Technologies Co., Ltd., Shenzhen (CN)

(*) Notice: Subject to any disclaimer, the term of this patent is extended or adjusted under 35 U.S.C. 154(b) by 0 days.

(21) Appl. No.: 16/009,486

(22) Filed: Jun. 15, 2018

(65) Prior Publication Data
US 2018/0295594 A1 Oct. 11, 2018

Related U.S. Application Data

(63) Continuation of application No. PCT/CN2016/107531, filed on Nov. 28, 2016.

(30) Foreign Application Priority Data

Dec. 29, 2015 (CN) .......................... 2015 1 1021783

(51) Int. Cl.
H04W 56/00 (2009.01)
H04W 24/10 (2009.01)
H04W 92/10 (2009.01)

(52) U.S. Cl.
CPC ......... H04W 56/001 (2013.01); H04W 24/10 (2013.01); H04W 56/0015 (2013.01); H04W 56/0075 (2013.01); H04W 92/10 (2013.01)

(58) Field of Classification Search
CPC ........... H04W 56/001; H04W 56/0015; H04W 56/002; H04W 56/004; H04W 56/0045;
(Continued)

(56) References Cited

U.S. PATENT DOCUMENTS 6,031,829 A 2/2000 Dupuy et al.
6,429,815 B1* 8/2002 Soliman ................ G01S 5/0054
342/357.64
(Continued)

FOREIGN PATENT DOCUMENTS

CN 1980211 A 6/2007
CN 101056142 A 10/2007
(Continued)

OTHER PUBLICATIONS

IEEE Std 802.11ad™-2012,IEEE Standard for Information technology—Telecommunications and information exchange between systems;Local and metropolitan area networks—Specific requirements,Part 11: Wireless LAN Medium Access Control (MAC) and Physical Layer (PHY) Specifications,Amendment 3: Enhancements for Very High Throughput in the 60 GHz Band,total 628 pages.
(Continued)

Primary Examiner — Kevin D Mew
(74) Attorney, Agent, or Firm — Fish & Richardson P.C.

(57) ABSTRACT

The present disclosure relates to the communications field, and provides a frame synchronization method, user equipment, and a base station, to implement frame time synchronization in a high-low frequency hybrid communications system. In one example method, a user equipment completes synchronization of a first frequency frame, determines a first moment of the synchronization of the first frequency frame, obtains a receive time difference, and completes synchronization of a second frequency frame according to the receive time difference and the first moment. The receive time difference is a time difference between a moment at which the user equipment receives the second frequency frame and a moment at which the user equipment receives the first frequency frame.

20 Claims, 10 Drawing Sheets

(58) Field of Classification Search
CPC ........... H04W 56/005; H04W 56/0055; H04W 56/0075; H04W 24/10; H04W 92/10
See application file for complete search history.

(56) References Cited

U.S. PATENT DOCUMENTS

| | | | |
|---|---|---|---|
| 6,433,739 B1* | 8/2002 | Soliman | G01S 5/0054 342/387 |
| 6,711,149 B1* | 3/2004 | Yano | H04W 36/18 370/331 |
| 2002/0009168 A1* | 1/2002 | Dick | H04B 1/7073 375/356 |
| 2006/0088023 A1* | 4/2006 | Muller | H04H 20/67 370/350 |
| 2007/0242789 A1 | 10/2007 | Jechoux et al. | |
| 2008/0026733 A1* | 1/2008 | Jaatinen | G01S 5/02 455/414.2 |
| 2009/0156228 A1* | 6/2009 | Mia | G01S 5/0221 455/456.1 |
| 2009/0325605 A1* | 12/2009 | Cha | G01S 5/0221 455/456.2 |
| 2011/0250887 A1* | 10/2011 | Tenny | H04W 56/00 455/436 |
| 2011/0286349 A1* | 11/2011 | Tee | H04W 24/10 370/252 |
| 2012/0307670 A1* | 12/2012 | Kazmi | H04W 24/10 370/252 |
| 2013/0235851 A1 | 9/2013 | Abu-Surra et al. | |
| 2014/0148107 A1 | 5/2014 | Maltsev et al. | |
| 2014/0225780 A1* | 8/2014 | Liu | G01S 5/06 342/465 |
| 2015/0030029 A1 | 1/2015 | Mohamed et al. | |
| 2016/0219535 A1 | 7/2016 | Zhang et al. | |
| 2016/0227373 A1* | 8/2016 | Tsai | H04W 4/025 |
| 2016/0286512 A1 | 9/2016 | Wang et al. | |
| 2017/0230087 A1* | 8/2017 | Sun | H04B 7/024 |
| 2017/0251332 A1* | 8/2017 | Aldana | H04W 4/029 |
| 2018/0024233 A1* | 1/2018 | Searcy | G01S 7/032 342/125 |
| 2018/0279403 A1 | 9/2018 | Kim | |
| 2019/0191397 A1* | 6/2019 | Pan | H04B 7/0695 |

FOREIGN PATENT DOCUMENTS

| | | | | |
|---|---|---|---|---|
| CN | 101102121 A | 1/2008 | | |
| CN | 101150389 A | 3/2008 | | |
| CN | 101577618 A | 11/2009 | | |
| CN | 104519576 A | 4/2015 | | |
| WO | WO-2011102769 A1 * | 8/2011 | ........... | H04W 24/10 |
| WO | 2015002466 A2 | 1/2015 | | |
| WO | 2015085550 A1 | 6/2015 | | |

OTHER PUBLICATIONS

International Search Report issued in International Application No. PCT/CN2016/107531 dated Feb. 21, 2017, 12 pages.
Office Action issued in Chinese Application No. 201511021783.2 dated Jul. 1, 2019, 15 pages (with English translation).

* cited by examiner

FRAME SYNCHRONIZATION METHOD, USER EQUIPMENT, AND BASE STATION

CROSS-REFERENCE TO RELATED APPLICATIONS

This application is a continuation of International Application No. PCT/CN2016/107531, filed on Nov. 28, 2016, which claims priority to Chinese Patent Application No. 201511021783.2, filed on Dec. 29, 2015. The disclosures of the aforementioned applications are hereby incorporated by reference in their entireties.

TECHNICAL FIELD

The present invention relates to the communications field, and in particular, to a frame synchronization method, user equipment, and a base station.

BACKGROUND

As a quantity of mobile terminals increases, users have higher requirements for a data volume, and a high frequency with rich bandwidth resources is introduced as a backhaul resource and an access frequency, to form a high-low frequency hybrid communications system, that is, both low-frequency communication and high-frequency communication can be performed between a base station and UE (user equipment). A beam of a high frequency needs to be relatively narrow, to ensure a particular transmission distance. However, a coverage area of a narrow beam system is limited. Therefore, to maximize an antenna gain, narrow-beam scanning alignment needs to be performed between a transmit end and a receive end. That is, when the transmit end scans a transmit beam, the receive end needs to scan a corresponding receive beam, so that synchronization of a high frequency frame is implemented. Only in this way, normal communication can be implemented between the base station and the UE.

In the current high-low frequency hybrid communications system, the base station has four transmit beams, and the UE has four receive beams (RX1 to RX4). If it is specified that a transmit beam and a receive beam that are aligned between the transmit end and the receive end are Z1 and RX1, respectively, the UE needs to receive, by using the receive beam RX1, all signals transmitted by using the transmit beam Z1. Only in this way, all data sent by the base station can be received.

In an actual case, the UE does not know when the base station scans a transmit beam, and therefore is uncertain about a synchronization point of a high frequency frame of the UE, that is, the UE is uncertain about a receive moment of the high frequency frame. Therefore, a case shown in FIG. 1 may occur. The UE scans a receive beam RX1 at a moment between a start moment and an end moment at which the base station scans a transmit beam Z1. In this case, the UE can never continuously receive a complete signal in the transmit beam Z1 and the receive beam RX1. It can be learned that, in the prior art, synchronization of the high-frequency frame cannot be implemented between the UE and the base station, and consequently, the UE cannot receive complete data transmitted by using a high frequency frame.

SUMMARY

The present invention provides a frame synchronization method, user equipment, and a base station, to implement frame synchronization in a hybrid network of different frequencies.

To achieve the foregoing objective, embodiments of the present invention use the following technical solutions:

Frame synchronization is explained first. Completing, by user equipment, synchronization of a first frequency frame means receiving, by the user equipment, the first frequency frame. A synchronization point of the first frequency frame is a moment at which the user equipment receives the first frequency frame. Similarly, completing, by the user equipment, synchronization of a second frequency frame means receiving, by the user equipment, the second frequency frame. A synchronization point of the second frequency frame is a moment at which the user equipment receives the second frequency frame. Certainly, the synchronization of the first frequency frame may also be referred to as time synchronization of the first frequency frame, and the synchronization of the second frequency frame may also be referred to as time synchronization of the second frequency frame.

According to a first aspect, a frame synchronization method is disclosed, where the method includes the following steps.

First, user equipment completes synchronization of a first frequency frame, and determines a first moment of the synchronization of the first frequency frame.

The first moment is a moment at which the user equipment receives the first frequency frame. The user equipment supports first-frequency communication and second-frequency communication, that is, may support low-frequency communication and high-frequency communication.

Then, the user equipment obtains a receive time difference, where the receive time difference is a time difference between a moment at which the user equipment receives a high frequency frame and the moment at which the user equipment receives the low frequency frame.

Next, the user equipment completes synchronization of a second frequency frame according to the receive time difference and the first moment.

In a hybrid network communications system of different frequencies, if a first frequency frame and a second frequency frame are sent in an alignment manner, that is, the first frequency frame and the second frequency frame are sent at a same moment, and it is assumed that a transmission path of the second frequency frame is the same as that of the first frequency frame, transmission duration of the second frequency frame is the same as that of the first frequency frame, and user equipment receives the first frequency frame and the second frequency frame at a same moment. Actually, the transmission path of the second frequency frame may be different from that of the first frequency frame, and therefore the transmission duration of the second frequency frame may be different from that of the first frequency frame. Even if a base station sends the second frequency frame and the first frequency frame simultaneously, the user equipment receives the high frequency frame and the low frequency frame at different moments, and a time difference exists.

Similarly, if a second frequency frame and a first frequency frame are not sent in an alignment manner, a time difference T exists between a moment at which the base station sends the second frequency frame and a moment at which the base station sends the first frequency frame. In addition, because of transmission paths, a time difference M exists between duration for transmitting the second frequency frame to the user equipment and duration for transmitting the first frequency frame to the user equipment. In this case, when determining the receive time difference, the user equipment needs to consider both the time difference T and the time difference M. It can be learned that the user equipment may use a receive moment of the first frequency frame as a reference for calculating a receive moment of the second frequency frame.

Further, with reference to the first aspect, in a first possible implementation of the first aspect, the user equipment may further determine a second moment at which the synchronization of the second frequency frame is completed, determine a time difference between the first moment and the second moment, and report the time difference between the first moment and the second moment to a base station.

For example, the second frequency frame is a high frequency frame. Although the user equipment cannot learn of a moment at which the base station scans a transmit beam, and therefore cannot determine a receive moment of the high frequency frame, the user equipment can determine a receive moment of a low frequency frame, and further obtain a time difference between the receive moment of the high frequency frame and the receive moment of the low frequency frame, so that the user equipment can determine a scan moment of a receive beam, to complete synchronization of the high frequency frame. That is, the user equipment can determine the receive moment (that is, the second moment) of the high frequency frame, and then scan the corresponding receive beam at the determined moment, and receive complete data.

It should be noted that the receive time difference obtained by the user equipment is merely a predicted difference value, and further a determined start moment for scanning the receive beam should also be a predicted moment. Therefore, when really completing the synchronization of the high frequency frame, the user equipment should determine an accurate receive moment of the high frequency frame (the second frequency frame), that is, the second moment.

The time difference herein is an accurate receive time difference. After receiving the time difference, the base station delivers the time difference to another user equipment (user equipment belonging to a same cell coverage area as the user equipment), so that the another user equipment can also determine, according to this accurate receive time difference, an accurate moment for scanning a receive beam, and further complete synchronization of a high frequency frame.

With reference to the first aspect, in a second possible implementation of the first aspect, that the user equipment completes synchronization of the second frequency frame according to the receive time difference and the first moment specifically includes:

the user equipment determines, according to the receive time difference and the first moment, a start moment for scanning a receive beam corresponding to the second frequency frame, scans the receive beam at the start moment, and receives data sent by using the second frequency frame, to complete the synchronization of the second frequency frame.

With reference to the second possible implementation of the first aspect, in a third possible implementation of the first aspect, that the user equipment determines, according to the receive time difference and the first moment, a start moment for scanning a receive beam corresponding to the second frequency frame specifically includes:

the user equipment determines a third moment according to a sum of the receive time difference and the first moment, and determines that the start moment is at least before the third moment.

That is, the user equipment may scan, at the third moment, the receive beam corresponding to the second frequency frame, or scan, before the third moment, the receive beam corresponding to the second frequency frame.

With reference to the first aspect, in a fourth possible implementation of the first aspect, the user equipment receives time difference indication information sent by a base station, where the time difference indication information carries a transmit time difference, and the transmit time difference is a time difference between a transmit moment of the second frequency frame and a transmit moment of the first frequency frame; and further calculates the receive time difference according to the transmit time difference.

Herein, the base station does not send the second frequency frame and the first frequency frame in an alignment manner, and therefore the transmit time difference needs to be considered when the receive time difference is calculated. Certainly, if the transmit time difference is 0, it indicates that the base station sends the second frequency frame and the first frequency frame in an alignment manner.

With reference to the fourth possible implementation of the first aspect, in a fifth possible implementation of the first aspect, the calculating the receive time difference according to the transmit time difference specifically includes:

determining the receive time difference $\Delta$ according to $\Delta=(d_2-d_1)/c+\delta$ where $d_2$ is a value of a transmission path on which the second frequency frame arrives at the user equipment, $d_1$ is a value of a transmission path on which the first frequency frame arrives at the user equipment, c is a speed of light, and $\delta$ is the transmit time difference. The value of the transmission path is a distance value of the transmission path.

During specific implementation, regardless of whether the user equipment performs high-low frequency intra-base-station communication, or the user equipment performs low-frequency communication with a macro base station and performs high-frequency communication with a micro base station, a transmission path of a second frequency frame and a transmission path of a first frequency frame may be different. Therefore, a difference between a path value of the second frequency frame and a path value of the first frequency frame is divided by the speed of the light, to obtain a difference between transmission duration of the second frequency frame and transmission duration of the first frequency frame, and then the transmission duration difference and a transmit time difference between a moment at which the base station sends the second frequency frame and a moment at which the base station sends the first frequency frame are added, to obtain a moment at which the user equipment receives the second frequency frame.

With reference to the first aspect, in a sixth possible implementation of the first aspect, the user equipment obtains the receive time difference by receiving the receive time difference sent by user equipment in a same cell.

It should be noted that if UE belonging to a same cell coverage area as the user equipment has completed synchronization of the second frequency frame and determined the receive time difference before the user equipment does, the UE may notify the user equipment of the receive time difference. During specific implementation, the UE may directly notify the user equipment of the receive time difference, or may notify the user equipment of a sequence number. The user equipment determines the receive time difference from a pre-stored receive time difference table according to the sequence number notified by the UE. For example, if the pre-stored receive time difference table is {−20, −10, −5, 0, 4, 12, 20}, and the sequence number notified by the UE in the same cell is 3, the receive time difference is determined as −5 (provided that the receive time differences are numbered from 1). Certainly, the base station and the user equipment use a same rule for numbering receive time differences in a receive time difference table. For example, the base station starts numbering from 0, and the user equipment also starts numbering from 0.

Alternatively, the user equipment obtains the receive time difference by receiving the receive time difference sent by a base station.

During specific implementation, the base station records the value $d_2$ of the transmission path on which the second frequency frame arrives at the user equipment, the value $d_1$ of the transmission path on which the first frequency frame arrives at the user equipment, and the transmit time difference $\delta$. Therefore, the base station can determine the receive time difference $\Delta$ according to $\Delta=(d_2-d_1)/c+\delta$.

Alternatively, the user equipment receives a time sequence number X sent by a base station, and determines an $X^{th}$ receive time difference in a pre-stored receive time difference table as the receive time difference, where N different receive time differences are recorded in the receive time difference table, and N is an integer greater than or equal to 1.

During specific implementation, the base station may determine a receive time difference $\Delta$ according to $\Delta=(d_2-d_1)/c+\delta$, and then determine, as X, a sequence number of a largest receive time difference in time differences less than $\Delta$ in a receive time difference table. Certainly, the receive time difference table on a base station side is the same as the receive time difference table pre-stored by the user equipment.

Alternatively, the user equipment determines the receive time difference according to a pre-stored value range of the receive time difference.

With reference to the fifth possible implementation of the first aspect, in a seventh possible implementation of the first aspect, the method further includes:

receiving scenario indication information delivered by the base station, and determining a scenario of the user equipment according to the scenario indication information; and determining a value of $(d_2-d_1)$ according to the scenario of the user equipment.

According to a second aspect, a frame synchronization method is disclosed, where the method includes:

determining, by a base station, a receive time difference, where the receive time difference is a time difference between a moment at which first user equipment receives a second frequency frame and a moment at which the first user equipment receives a first frequency frame; and sending, by the base station, the receive time difference to the first user equipment, so that the first user equipment completes synchronization of the second frequency frame according to the receive time difference and a moment at which the first user equipment completes synchronization of the first frequency frame.

With reference to the second aspect, in a first possible implementation of the second aspect, the determining, by a base station, a receive time difference specifically includes:

obtaining, by the base station, a transmit time difference, where the transmit time difference is a time difference between a transmit moment of the second frequency frame and a transmit moment of the first frequency frame; and determining the receive time difference $\Delta$ according to $\Delta=(d_2-d_1)/c+\delta$, where $d_2$ is a value of a transmission path on which the second frequency frame arrives at the first user equipment, $d_1$ is a value of a transmission path on which the first frequency frame arrives at the first user equipment, c is a speed of light, and $\delta$ is the transmit time difference.

With reference to the second aspect, in a second possible implementation of the second aspect, the determining, by a base station, a receive time difference specifically includes:

receiving a time difference, reported by second user equipment, between a first moment at which the second user equipment receives the first frequency frame and a second moment at which the second user equipment completes synchronization of the second frequency frame, where the second user equipment and the first user equipment belong to a same cell; and determining the time difference as the receive time difference.

Certainly, before determining the receive time difference, the base station may receive the time difference, reported by the second user equipment, between the first moment at which the second user equipment receives the first frequency frame and the second moment at which the second user equipment completes the synchronization of the second frequency frame.

According to a third aspect, user equipment is disclosed, where the user equipment supports first-frequency communication and second-frequency communication, and includes:

a frame synchronization unit, configured to complete synchronization of a first frequency frame;

a determining unit, configured to determine a first moment at which the user equipment completes the synchronization of the first frequency frame; and an obtaining unit, configured to obtain a receive time difference, where the receive time difference is a time difference between a moment at which the user equipment receives a second frequency frame and a moment at which the user equipment receives a first frequency frame, where the frame synchronization unit is configured to complete synchronization of the second frequency frame according to the receive time difference obtained by the obtaining unit and the first moment determined by the determining unit.

With reference to the third aspect, in a first possible implementation of the third aspect, the determining unit is further configured to determine a second moment at which the synchronization of the second frequency frame is completed.

Although the user equipment cannot learn of a moment at which a base station scans a transmit beam, and therefore cannot determine the receive moment of the second frequency frame, the user equipment can determine the receive moment of the first frequency frame, and further obtain the time difference between the receive moment of the second frequency frame and the receive moment of the first frequency frame, so that the user equipment can determine the receive moment (that is, the second moment) of the second frequency frame, and then scan a corresponding receive beam at the determined moment, and receive complete data.

The determining unit is further configured to determine a time difference between the first moment and the second moment.

A sending unit is configured to report the time difference between the first moment and the second moment to a base station.

With reference to the third aspect, in a second possible implementation of the third aspect, the determining unit is specifically configured to:

determine, according to the receive time difference and the first moment, a start moment for scanning a receive beam corresponding to the second frequency frame; and scan the receive beam at the start moment determined by the determining unit, and receive data sent by using the second frequency frame, to complete the synchronization of the second frequency frame.

With reference to the second possible implementation of the third aspect, in a third possible implementation of the third aspect, the determining unit is specifically configured to: determine a third moment according to a sum of the receive time difference and the first moment, and determine that the start moment is at least before the third moment.

With reference to the third aspect, in a fourth possible implementation of the third aspect, the obtaining unit is specifically configured to:

receive time difference indication information sent by a base station, where the time difference indication information carries a transmit time difference, and the transmit time difference is a time difference between a transmit moment of the second frequency frame and a transmit moment of the first frequency frame; and calculate the receive time difference according to the transmit time difference.

With reference to the fourth possible implementation of the third aspect, in a fifth possible implementation of the third aspect, the obtaining unit is specifically configured to:

determine the receive time difference $\Delta$ according to $\Delta=(d_2-d_1)/c+\delta$, where $d_2$ is a value of a transmission path on which the second frequency frame arrives at the user equipment, $d_1$ is a value of a transmission path on which the first frequency frame arrives at the user equipment, c is a speed of light, and $\delta$ is the transmit time difference.

With reference to the third aspect, in a sixth possible implementation of the third aspect, the obtaining unit is specifically configured to receive the receive time difference sent by user equipment in a same cell; or receive the receive time difference sent by a base station; or receive a time sequence number X sent by a base station, and determine an $X^{th}$ receive time difference in a pre-stored receive time difference table as the receive time difference; or determine the receive time difference according to a pre-stored value range of the receive time difference.

With reference to the fifth possible implementation of the third aspect, in a seventh possible implementation of the third aspect, the obtaining unit is specifically configured to: receive scenario indication information delivered by the base station, determine a scenario of the user equipment according to the scenario indication information, and determine a value of $(d_2-d_1)$ according to the scenario of the user equipment.

According to a fourth aspect, a base station is disclosed, where the base station includes:

a determining unit, configured to determine a receive time difference, where the receive time difference is a time difference between a moment at which first user equipment receives a second frequency frame and a moment at which the first user equipment receives a first frequency frame; and a sending unit, configured to send the receive time difference to the first user equipment, so that the first user equipment completes synchronization of the second frequency frame according to the receive time difference and a moment at which the first user equipment completes synchronization of the first frequency frame.

With reference to the fourth aspect, in a first possible implementation of the fourth aspect, the determining unit is specifically configured to: obtain a transmit time difference, where the transmit time difference is a time difference between a transmit moment of the second frequency frame and a transmit moment of the first frequency frame; and determine the receive time difference $\Delta$ according to $\Delta=(d_2-d_1)/c+\delta$, where $d_2$ is a value of a transmission path on which the second frequency frame arrives at the first user equipment, $d_1$ is a value of a transmission path on which the first frequency frame arrives at the first user equipment, c is a speed of light, and $\delta$ is the transmit time difference.

With reference to the fourth aspect, in a second possible implementation of the fourth aspect, the base station further includes a receiving unit, where the receiving unit is configured to receive a time difference, reported by second user equipment, between a first moment at which the second user equipment receives the first frequency frame and a second moment at which the second user equipment completes synchronization of the second frequency frame, where the second user equipment and the first user equipment belong to a same cell; and the determining unit is specifically configured to determine the time difference as the receive time difference.

According to the frame synchronization method, the user equipment, and the base station provided in the present invention, the receive time difference between the moment at which the user equipment receives the second frequency frame and the moment at which the user equipment receives the first frequency frame can be obtained, and the synchronization of the second frequency frame is implemented according to the receive time difference and the first moment of the synchronization of the first frequency frame. It can be learned that according to the method provided in the present invention, frame synchronization can be implemented in a hybrid network of different frequencies.

BRIEF DESCRIPTION OF DRAWINGS

To describe the technical solutions in the embodiments of the present invention or in the prior art more clearly, the following briefly introduces the accompanying drawings required for describing the embodiments or the prior art. Apparently, the accompanying drawings in the following description show merely some embodiments of the present invention, and a person of ordinary skill in the art may still derive other drawings from these accompanying drawings without creative efforts.

FIG. 11 a is another structural block diagram of a base station according to Embodiment 5 of the present invention;

DESCRIPTION OF EMBODIMENTS

The following clearly describes the technical solutions in the embodiments of the present invention with reference to the accompanying drawings in the embodiments of the present invention. Apparently, the described embodiments are merely some but not all of the embodiments of the present invention. All other embodiments obtained by a person of ordinary skill in the art based on the embodiments of the present invention without creative efforts shall fall within the protection scope of the present invention.

Embodiment 1

Figure 1:
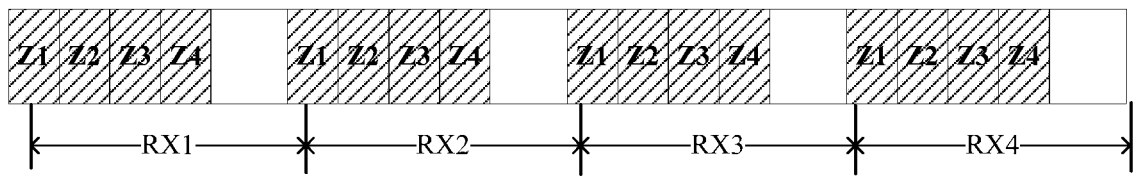
FIG. 1 is a schematic diagram of receiving a high frequency frame by user equipment in the prior art.
Figure 2:
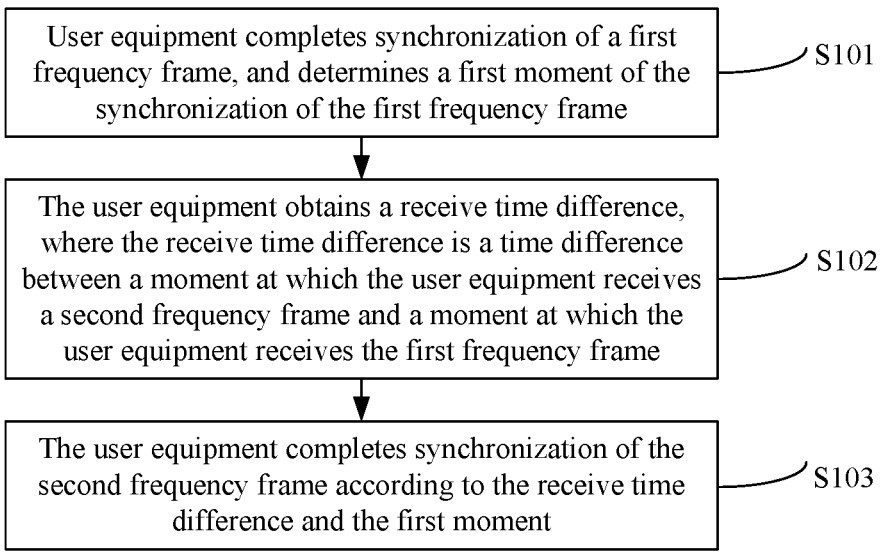
FIG. 2 is a schematic flowchart of a frame synchronization method according to Embodiment 1 of the present invention.

This embodiment of the present invention provides a frame synchronization method. As shown in FIG. 2, the method includes the following steps.

S101. User equipment completes synchronization of a first frequency frame, and determines a first moment of the synchronization of the first frequency frame.

It should be noted that the first frequency frame may be a low frequency frame. In the present invention, a frequency range of the low frequency frame has been described, and details are not described herein again. In addition, the user equipment supports first-frequency communication and second-frequency communication.

During specific implementation, the user equipment may receive a synchronization signal sent by a base station, and determine the first moment according to the synchronization signal.

S102. The user equipment obtains a receive time difference, where the receive time difference is a time difference between a moment at which the user equipment receives a second frequency frame and a moment at which the user equipment receives a first frequency frame.

The second frequency frame may be a high frequency frame.

S103. The user equipment completes synchronization of the second frequency frame according to the receive time difference and the first moment.

During specific implementation, a third moment may be determined according to the receive time difference and the first moment, and the second frequency frame is received at least before the third moment, so that the synchronization of the second frequency frame is completed.

According to the frame synchronization method in this embodiment of the present invention, the user equipment determines the first moment of the synchronization of the first frequency frame, obtains the receive time difference (that is, the time difference between the moment at which the user equipment receives the second frequency frame and the moment at which the user equipment receives the first frequency frame), and determines, according to the receive time difference and the first moment, the receive moment of the second frequency frame, to implement the synchronization of the second frequency frame. In the prior art, the user equipment is uncertain about a synchronization point of each type of frequency frame in a hybrid network of different frequencies (for example, cannot implement synchronization of a high frequency frame) and cannot implement time synchronization between the user equipment and the base station, and therefore the user equipment cannot receive complete data. According to the method provided in the present invention, the user equipment can determine the receive moment of the second frequency frame, and further implement frame synchronization in the hybrid network of different frequencies.

Embodiment 2

The frame synchronization method provided in the present invention may be applied to a high-low frequency hybrid communications system. User equipment may perform both high-frequency communication and low-frequency communication with a same base station (that is, high-low frequency intra-base-station communication). Alternatively, user equipment performs low-frequency communication with a macro base station, and performs high-frequency communication with a micro base station. The low-frequency communication is communication implemented by using a low frequency signal. Similarly, the high-frequency communication is communication implemented by using a high frequency frame.

The following describes in detail the frame synchronization method provided in the present invention, by assuming that a second frequency frame is a high frequency frame and a first frequency frame is a low frequency frame. A frequency corresponding to the first frequency frame is a first frequency, and a frequency corresponding to the second frequency frame is a second frequency. Signals include a low frequency (Low Frequency, LF) signal, a high frequency (High Frequency, HF) signal, and the like. A frequency of the low frequency signal is below 6 GHz, and a frequency of the high frequency signal is above 6 GHz. Certainly, the first frequency is not limited to being below 6 GHz, and the second frequency is not limited to being above 6 GHz. The first frequency and the second frequency are not limited in the present invention, provided that during specific implementation, the first frequency and the second frequency are different and the first frequency frame and the second frequency frame are different. The low frequency signal is transmitted in uplink and downlink by using a low frequency frame, and the high frequency signal is transmitted in uplink and downlink by using a high frequency frame. The high frequency frame has a similar frame structure to a low frequency frame in an LTE system. However, a difference lies in that the high frequency frame is sent and received by using a narrow beam, and strict narrow-beam scanning alignment needs to be ensured between a transmit end and a receive end. For example, it is assumed that a transmit beam and a receive beam that are aligned between a base station and user equipment are Z1 and R1, respectively. At a start moment at which the base station scans Z1, the user equipment needs to scan R1. Only in this way, time synchronization between the user equipment and the base station can be ensured, and a complete signal in the transmit beam Z1 and the receive beam R1 can be received.

In addition, it should be noted that, completing, by the user equipment, synchronization of a low frequency frame means receiving, by the user equipment, the low frequency frame. A synchronization point of the low frequency frame is a moment at which the user equipment receives the low frequency frame. Similarly, completing, by the user equipment, synchronization of a high frequency frame means receiving, by the user equipment, the high frequency frame. A synchronization point of the high frequency frame is a moment at which the user equipment receives the high frequency frame. Certainly, the synchronization of the low frequency frame may also be referred to as time synchronization of the low frequency frame, and the synchronization of the high frequency frame may also be referred to as time synchronization of the high frequency frame.

Figure 3:
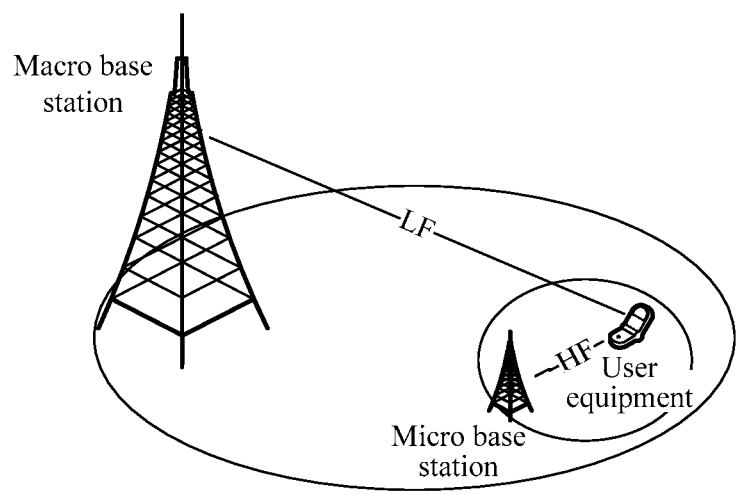
FIG. 3 is an architectural diagram of a high-low frequency hybrid communications system according to an embodiment of the present invention.
Figure 4:
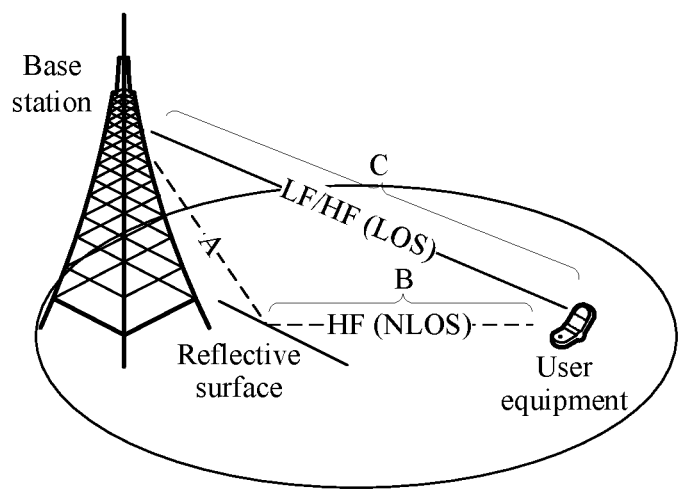
FIG. 4 is another architectural diagram of a high-low frequency hybrid communications system according to an embodiment of the present invention.

The high-low frequency hybrid communications system may be shown in FIG. 3 and FIG. 4. Referring to FIG. 3, user equipment performs low-frequency communication with a macro base station, and performs high-frequency communication with a micro base station. Referring to FIG. 4, user equipment may perform both high-frequency communication and low-frequency communication with a base station. A transmission path of a high frequency frame is first described. Referring to FIG. 4, transmission paths of the high frequency frame may be classified into a LOS (line of sight) and an NLOS (non line of sight). LOS transmission means that a transmission path of a high frequency frame between a base station and user equipment is approximately a path indicated by a line between the base station and the user equipment. NLOS transmission means that a transmission path of a signal (that is, a high frequency frame) changes due to a reflective surface, but a low frequency frame is still transmitted by using an LOS. As a result, in a high-low frequency intra-base-station communication scenario shown in FIG. 4, a transmission path of a high frequency frame and a transmission path of a low frequency frame are still different.

In a scenario shown in FIG. 3, even if both a low frequency frame sent by the macro base station and a high frequency frame sent by the micro base station are transmitted by using a LOS, a transmission path of the low frequency frame sent by the macro base station and a transmission path of the high frequency frame sent by the micro base station are different. If a low frequency frame is transmitted by using a LOS, and a high frequency frame is transmitted by using an NLOS, a transmission path of the low frequency frame sent by the macro base station and a transmission path of the high frequency frame sent by the micro base station are still different.

In the scenarios in FIG. 3 and FIG. 4, if a high frequency frame and a low frequency frame are sent in an alignment manner, that is, the high frequency frame and the low frequency frame are sent at a same moment, and it is assumed that a transmission path of the high frequency frame is the same as that of the low frequency frame, transmission duration of the high frequency frame is the same as that of the low frequency frame, and the user equipment receives the high frequency frame and the low frequency frame at a same moment. Actually, the transmission path of the high frequency frame is different from that of the low frequency frame, and therefore the transmission duration of the high frequency frame is different from that of the low frequency frame. Even if a base station sends the high frequency frame and the low frequency frame simultaneously, the user equipment receives the high frequency frame and the low frequency frame at different moments, and a time difference exists.

Similarly, if a high frequency frame and a low frequency frame are not sent in an alignment manner, a time difference T exists between a moment at which the base station sends the high frequency frame and a moment at which the base station sends the low frequency frame. In addition, because of transmission paths, a time difference M exists between duration for transmitting the high frequency frame to the user equipment and duration for transmitting the low frequency frame to the user equipment. In this case, when determining a receive time difference, the user equipment needs to consider both the time difference T and the time difference M. It can be learned that the user equipment may use a receive moment of the low frequency frame as a reference for calculating a receive moment of the high frequency frame.

Based on this, a principle of the present invention is as follows: User equipment first implements synchronization of a low frequency frame according to a low-frequency synchronization signal, determines a receive moment of the low frequency frame, and obtains a receive time difference between the receive moment of the low frequency frame and a receive moment of a high frequency frame, and further can calculate the receive moment of the high frequency frame according to the receive moment of the low frequency frame and the receive time difference.

Figure 5:
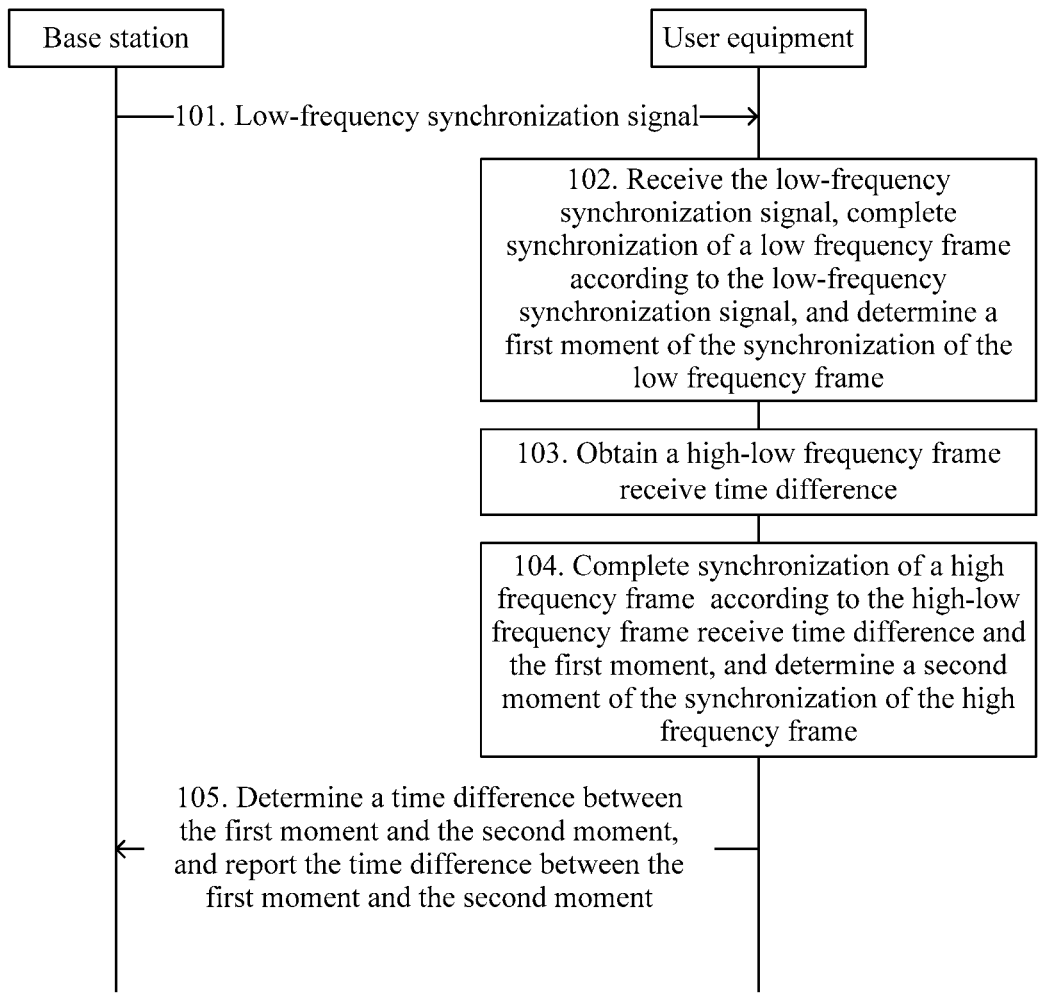
FIG. 5 is a schematic flowchart of a frame synchronization method according to Embodiment 2 of the present invention.

This embodiment of the present invention provides a frame synchronization method, applied to the high-low frequency hybrid communications system shown in FIG. 3 or FIG. 4. As shown in FIG. 5, the method includes the following steps.

101. A base station sends a low-frequency synchronization signal to user equipment.

In this embodiment, for example, a first frequency frame is a low frequency frame and a second frequency frame is a high frequency frame. The low-frequency synchronization signal is used to determine a first moment at which the user equipment receives the low frequency frame. Usually, the base station may send the low-frequency synchronization signal to the user equipment, so that the user equipment determines when to receive the low frequency frame.

It should be noted that in the scenario shown in FIG. 3, the macro base station performs low-frequency communication with the user equipment, and therefore the macro base station sends the low-frequency synchronization signal to the user equipment. In addition, in the scenario shown in FIG. 3, the macro base station is mainly used, and the macro base station records a moment at which the micro base station sends a high frequency frame and a time difference between a moment at which the macro base station sends a low frequency frame and the moment at which the micro base station sends the high frequency frame. In the scenario shown in FIG. 4, high-low frequency intra-base-station communication is performed, that is, the base station in FIG. 4 sends the low-frequency synchronization signal to the user equipment.

102. The user equipment receives the low-frequency synchronization signal sent by the base station, completes synchronization of a low frequency frame according to the low-frequency synchronization signal, and determines a first moment of the synchronization of the low frequency frame.

It should be noted that, completing, by the user equipment, synchronization of a low frequency frame means receiving, by the user equipment, the low frequency frame. A synchronization point of the low frequency frame is a moment at which the user equipment receives the low frequency frame.

A detailed solution for implementing synchronization of a low frequency frame (that is, determining a receive moment of the low frequency frame) according to a low-frequency synchronization signal sent by a base station is provided in an existing frame synchronization technology, and details are not described herein. For example, the low-frequency synchronization signal may be a 10-μs bit sequence, a receive end sequentially receives the 10-μs bit sequence, performs multiplication and addition operations, and determines a moment corresponding to a largest calculated value as a moment at which the receive end receives the low frequency frame, that is, the first moment.

It should be noted that only one implementation of completing, by the user equipment, the synchronization of the low frequency frame is provided in step 101 and step 102, and the user equipment may determine the receive moment of the low frequency frame in another manner, to complete the synchronization of the low frequency frame. This is not limited herein.

103. The user equipment obtains a receive time difference.

The receive time difference is a time difference between a moment at which the user equipment receives the high frequency frame and the moment at which the user equipment receives the low frequency frame.

During specific implementation, the user equipment may obtain the receive time difference in the following five manners:

1. The user equipment receives time difference indication information sent by the base station, and calculates the receive time difference according to a transmit time difference carried in the time difference indication information.

The transmit time difference is a time difference between a transmit moment of the high frequency frame and a transmit moment of the low frequency frame. Herein, the base station does not send the high frequency frame and the low frequency frame in an alignment manner, and therefore the transmit time difference needs to be considered when the receive time difference is calculated. Certainly, if the transmit time difference is 0, it indicates that the base station sends the high frequency frame and the low frequency frame in an alignment manner.

Figure 6:
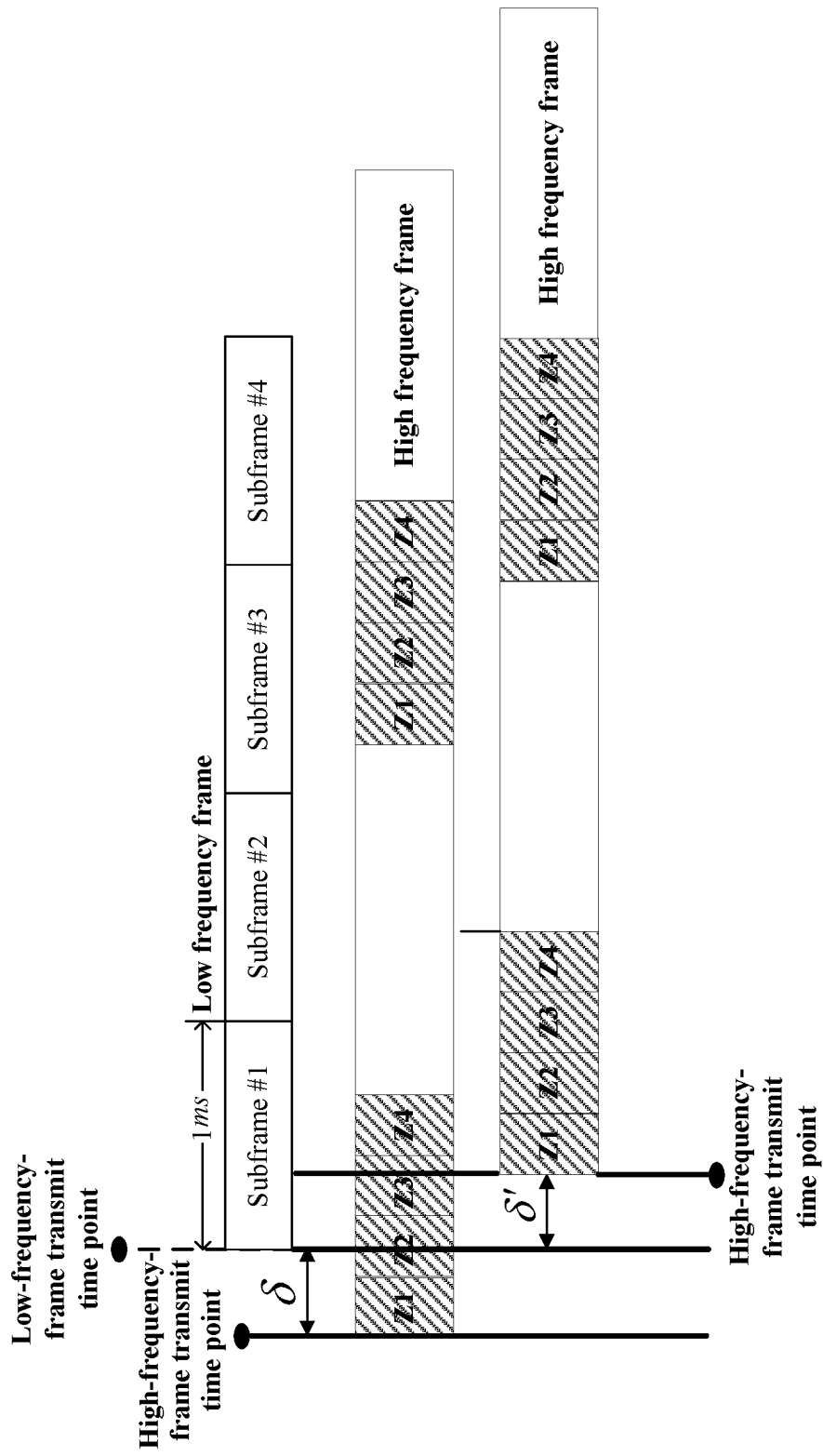
FIG. 6 is a schematic diagram of sending a high frequency frame and a low frequency frame according to Embodiment 2 of the present invention.

A frame structure of the high frequency frame and a frame structure of the low frequency frame are shown in FIG. 6. Each subframe of the high frequency frame and each subframe of the low frequency frame may be 1 ms long. Referring to FIG. 6, the base station may first send the high frequency frame and then send the low frequency frame, that is, the transmit time difference δ is less than 0. Alternatively, the base station may first send the low frequency frame and then send the high frequency frame. In this case, the transmit time difference δ' is greater than 0. Certainly, in the scenario shown in FIG. 4, both the high frequency frame and the low frequency frame are sent by the base station in the figure, and therefore the time difference indication information is also sent by the base station shown in FIG. 4. In the scenario shown in FIG. 3, the high frequency frame is sent by the micro base station, and the low frequency frame is sent by the macro base station. The macro base station records the moment at which the macro base station sends the low frequency frame, and when sending the high frequency frame, the micro base station sends indication information to the macro base station, to notify the macro base station of the transmit moment of the high frequency frame. Therefore, the macro base station can determine the transmit time difference. Further, the time difference indication information is indicated by the macro base station to the user equipment.

Figure 6A:
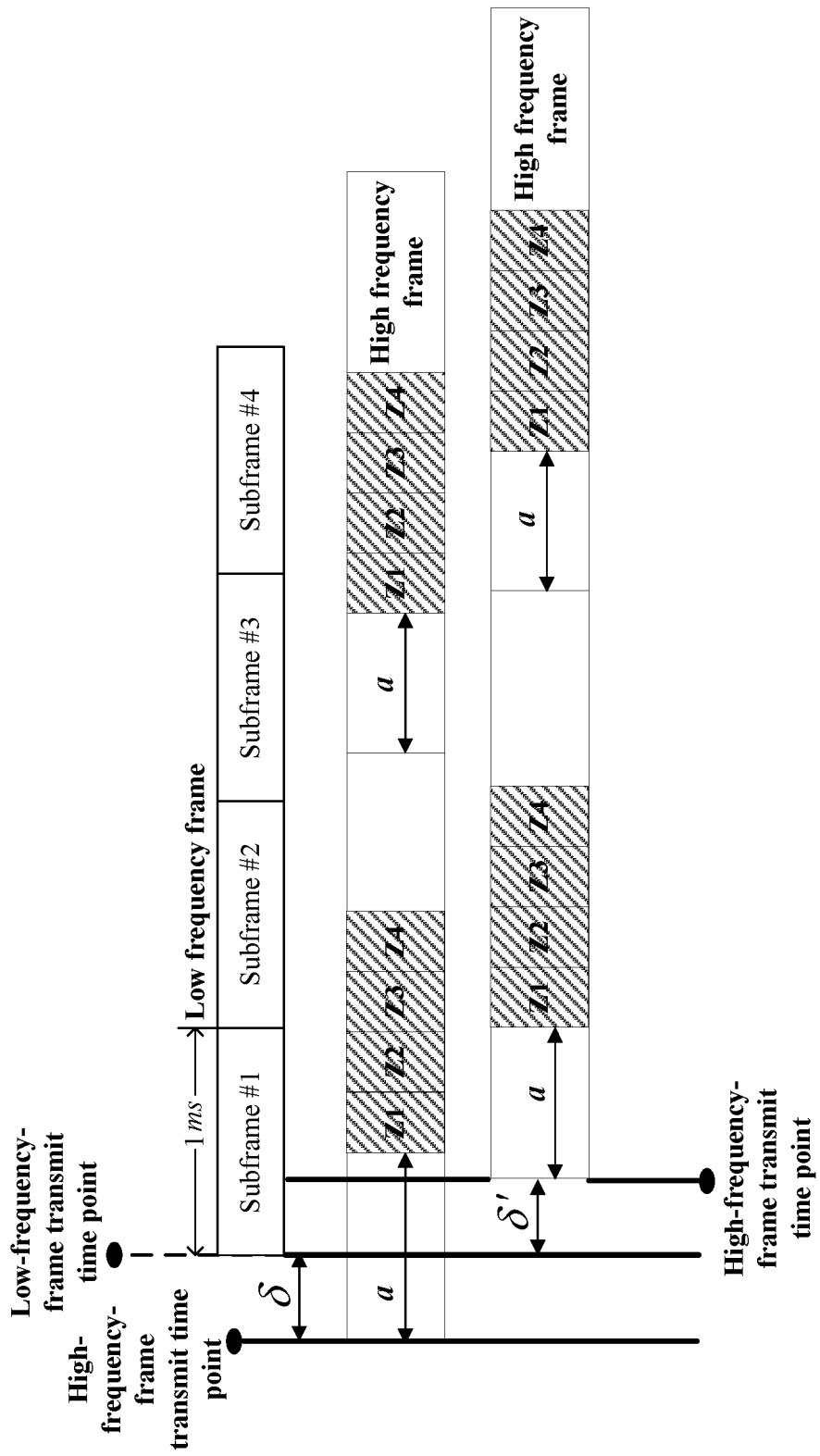
FIG. 6a is another schematic diagram of sending a high frequency frame and a low frequency frame according to Embodiment 2 of the present invention.

In addition, as shown in FIG. 6a, each time before sending a high frequency frame, the base station needs to perform adaptive adjustment in a period of time (duration is a), where a represents a time difference between a transmit time point of a high-frequency synchronization signal and a transmit time point of the high frequency frame. The time difference a is fixed, and both the user equipment and the base station record the time difference. In a scenario shown in FIG. 6a, after obtaining the receive time difference Δ, the user equipment needs to adjust, according to Δ+a, a start moment for scanning a receive beam corresponding to the high frequency frame. For example, if the first moment (that is, the synchronization point of the low-frequency frame) is determined as T, a third moment is determined as T+Δ+a, and it is determined that the start moment for scanning the receive beam is at least before the third moment. It should be noted that when a=0, the foregoing scenario shown in FIG. 6 is applied.

Further, the calculating the receive time difference according to the transmit time difference specifically includes:

determining the receive time difference Δ according to $\Delta=(d_2-d_1)/c+\delta$, where $d_2$ is a value of a transmission path on which the high frequency frame arrives at the user equipment, $d_1$ is a value of a transmission path on which the low frequency frame arrives at the user equipment, c is a speed of light, and δ is the transmit time difference. The value of the transmission path is a distance value of the transmission path.

Figure 7:
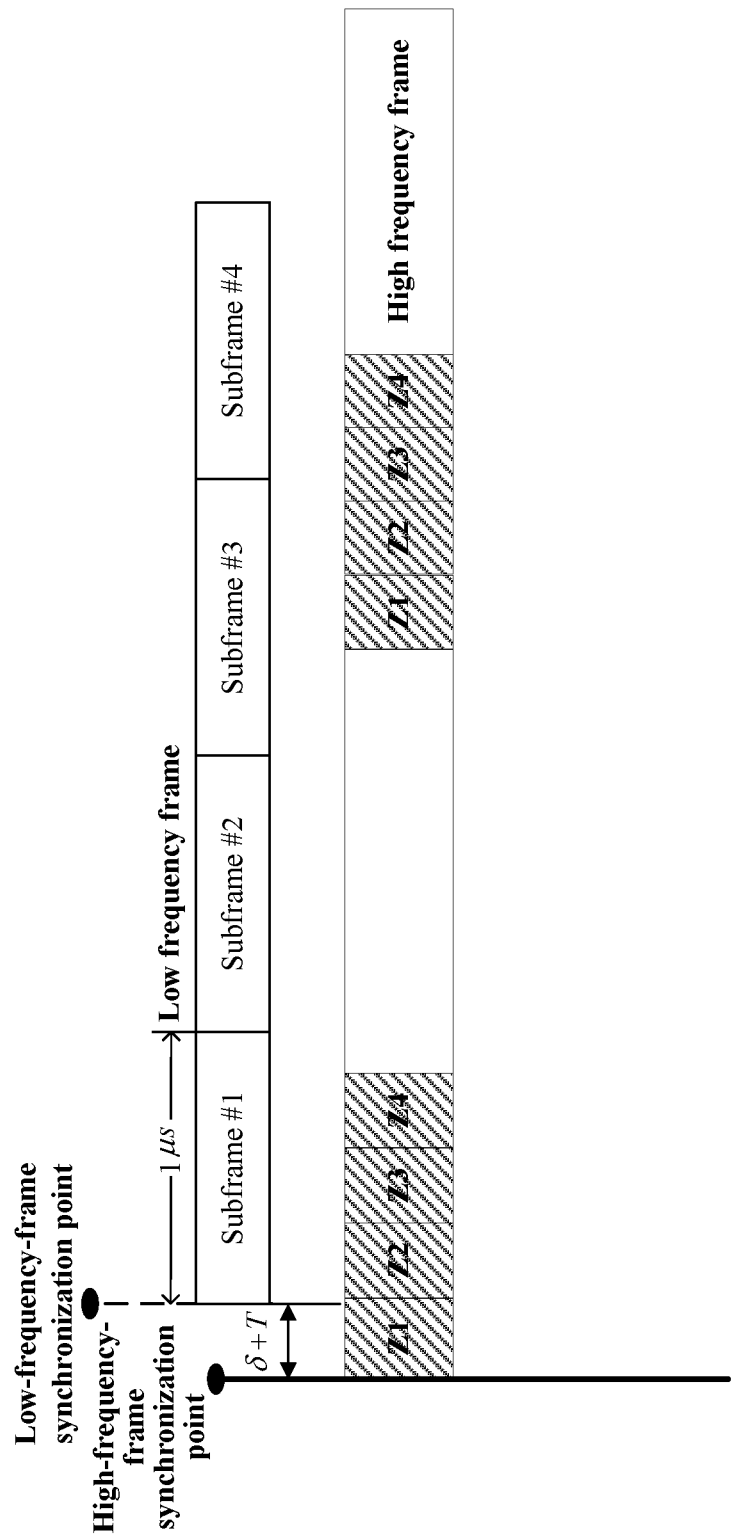
FIG. 7 is a schematic diagram of receiving a high frequency frame and a low frequency frame according to Embodiment 2 of the present invention.

For example, referring to FIG. 6, when the base station sends a high frequency frame earlier than a low frequency frame, a time difference is δ (less than 0), and it is assumed that $(d_2-d_1)/c$ is T, the second moment may be shown in FIG. 7. When a value of a transmission path on which the high frequency frame arrives at the user equipment is greater than a value of a transmission path on which the low frequency frame arrives at the user equipment, T is greater than 0, that is, transmission duration of the high frequency frame is greater than transmission duration of the low frequency frame. In this case, because δ is less than 0 and T is greater than 0, an absolute value of (T+δ) is less than an absolute value of δ, and further, a time difference between a moment at which the user equipment receives the low frequency frame and a moment at which the user equipment receives the high frequency frame in FIG. 7 is less than the time difference between a moment at which the base station sends the low frequency frame and a moment at which the base station sends the high frequency frame in FIG. 6. In addition, a synchronization point of a high frequency frame is a moment at which the high frequency frame is received provided that synchronization of the high frequency frame can be implemented. A synchronization point of a low frequency frame is a receive moment that is of the low frequency frame and that is determined according to a low-frequency synchronization signal.

During specific implementation, regardless of whether the user equipment performs high-low frequency intra-base-station communication, or the user equipment performs low-frequency communication with a macro base station and performs high-frequency communication with a micro base station, a transmission path of a high frequency frame and a transmission path of a low frequency frame may be different. Therefore, a difference between a path value of the high frequency frame and a path value of the low frequency frame is divided by the speed of the light, to obtain a difference between transmission duration of the high frequency frame and transmission duration of the low frequency frame, and then the transmission duration difference and a transmit time difference between a moment at which the base station sends the high frequency frame and a moment at which the base station sends the low frequency frame are added, to obtain a moment at which the user equipment receives the high frequency frame. For example, referring to FIG. 4, a value of a transmission path of the high frequency frame is A+B, and a value of a transmission path of the low frequency frame is C. A+B is used as $d_2$ and C is used as $d_1$ in the formula $\Delta=(d_2-d_1)/c+\delta$, and the receive time difference $\Delta$ can be calculated.

2. The user equipment obtains the receive time difference by receiving the receive time difference sent by user equipment in a same cell.

It should be noted that the user equipment in the same cell learns of the receive time difference in advance. The receive time difference may be determined after the user equipment in the same cell completes synchronization of a high frequency frame, or may be indicated by the base station to the user equipment in the same cell.

Figure 8:
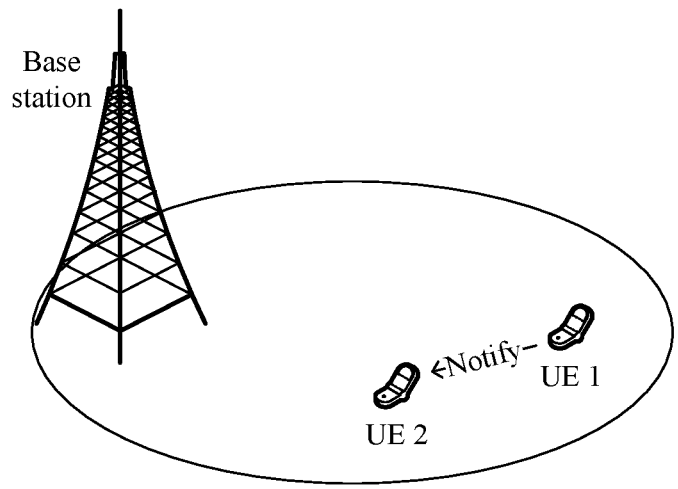
FIG. 8 is a schematic diagram of obtaining a receive time difference by user equipment according to Embodiment 2 of the present invention.

For example, as shown in FIG. 8, if UE 2 belonging to a same cell coverage area as the user equipment (UE 1) has completed synchronization of a high frequency frame and determined the receive time difference before the user equipment does, the UE 2 may notify the user equipment of the receive time difference. During specific implementation, the UE 2 may directly notify the user equipment of the receive time difference, or may notify the user equipment of a sequence number. The user equipment determines the receive time difference from a pre-stored receive time difference table according to the sequence number notified by the UE 2. For example, if the receive time difference table pre-stored by the UE 1 is {−20, −10, −5, 0, 4, 12, 20}, and the sequence number notified by the UE 2 is 3, the receive time difference is determined as −5 (provided that the receive time differences are numbered from 1). Certainly, the base station and the user equipment use a same rule for numbering receive time differences in a receive time difference table. For example, the base station starts numbering from 0, and the user equipment also starts numbering from 0.

3. The user equipment obtains the receive time difference by receiving the receive time difference sent by the base station.

During specific implementation, the base station records the value $d_2$ of the transmission path on which the high frequency frame arrives at the user equipment, the value $d_1$ of the transmission path on which the low frequency frame arrives at the user equipment, and the transmit time difference $\delta$. Therefore, the base station can determine the receive time difference $\Delta$ according to $\Delta=(d_2-d_1)/c+\delta$.

It should be noted that the macro base station in the scenario shown in FIG. 3 or the base station in the scenario shown in FIG. 4 sends the receive time difference to the user equipment herein.

4. That the user equipment obtains a receive time difference specifically includes:

receiving a time sequence number X sent by the base station, and determining an $X^{th}$ receive time difference in a pre-stored receive time difference table as the receive time difference.

During specific implementation, the base station may determine a receive time difference $\Delta$ according to $\Delta=(d_2-d_1)/c+\delta$, and then determine, as X, a sequence number of a largest receive time difference in time differences less than $\Delta$ in a receive time difference table. Certainly, the receive time difference table on a base station side is the same as the receive time difference table pre-stored by the user equipment.

5. The user equipment receives scenario indication information delivered by the base station, determines a scenario of the user equipment according to the scenario indication information, and determines a value of $(d_2-d_1)$ according to the scenario of the user equipment.

For example, both the base station and the user equipment pre-store value ranges of the receive time difference, and the value ranges of the receive time difference that are pre-stored by the base station and the user equipment are the same. For example, both the base station and the user equipment store $\delta \in [\delta_{min}, \delta_{max}]$. If the user equipment determines, according to the scenario indication information from the base station, that a current application scenario is the scenario shown in FIG. 3, the user equipment determines that a high-low frequency frame receive time difference exists when the user equipment is farthest from the macro base station (that is, in a cell edge of the macro base station) and is at a shortest distance (equal to 0) from the micro base station. It is assumed that the inter-site distance of the macro base stations, ISD=500 m, in consideration of an NLOS, a maximum transmission distance of the macro base station should not exceed 450 m. Assuming that $\delta=\delta_{min}=10$ μs, $$\Delta_{min}=(d_{HF}-d_{LF})/C+\delta=-1.5-10=-11.5 \text{ μs}$$

That is, a synchronization point of a high frequency frame is a maximum of 11.5 μs earlier than a synchronization point of a low frequency frame.

If the user equipment determines, according to the scenario indication information from the base station, that a current application scenario is the scenario shown in FIG. 4, due to high-low frequency intra-base-station communication, a largest time difference is less than that in the scenario shown in FIG. 3. For example, due to NLOS transmission, a transmission distance of a low frequency signal is a maximum of 450 m longer than that of a high frequency signal transmitted by using a LOS, and $\delta=\delta_{min}=-2$ μs (due to the high-low frequency intra-base-station communication), and therefore $$\Delta_{min}=(d_{HF}-d_{LF})/C+\delta=-1.5-2=-3.5 \text{ μs}$$

That is, a synchronization point of a high frequency frame is a maximum of 3.5 μs earlier than a synchronization point of a low frequency frame.

In addition, if the user equipment cannot receive the scenario indication information from the base station, a value is determined from the pre-stored value range $\delta \in [\delta_{min}, \delta_{max}]$ of the receive time difference. For example, it is determined that $\delta=\delta_{min}$.

104. The user equipment completes synchronization of a high frequency frame according to the receive time difference and the first moment.

It should be noted that, the completing, by the user equipment, synchronization of a high frequency frame means receiving, by the user equipment, the high frequency frame. A synchronization point of the high frequency frame is a moment at which the user equipment receives the high frequency frame.

During specific implementation, the user equipment determines, according to the receive time difference and the first moment, a start moment for scanning a receive beam corresponding to the high frequency frame, scans the receive beam at the start moment, and receives data sent by using the high frequency frame, to complete the synchronization of the high frequency frame.

Further, that the user equipment determines, according to the receive time difference and the first moment, a start moment for scanning a receive beam corresponding to the high frequency frame is specifically: determining a third moment according to a sum of the receive time difference and the first moment, and determining that the start moment is at least before the third moment.

For example, if a difference between a moment at which the base station sends the high frequency frame and a moment at which the base station sends the low frequency frame is T, and a difference between transmission duration of the high frequency frame and transmission duration of the low frequency frame is M, the receive time difference is T+M. If T+M is greater than 0, a receive moment of the high frequency frame is later than a receive moment of the low frequency frame. If T+M is less than 0, a receive moment of the high frequency frame is before a receive moment of the low frequency frame. For example, if the first moment is a subframe #n, and T+M is greater than 0, the third moment may be a subframe #(n+T+M). Certainly, the third moment may alternatively be before the subframe #(n+T+M).

Further, the frame synchronization method provided in this embodiment may further include step 105.

105. The user equipment determines a second moment of the synchronization of the high frequency frame, determines a time difference between the first moment and the second moment, and reports the time difference between the first moment and the second moment to the base station.

It should be noted that the receive time difference obtained by the user equipment is merely a predicted difference value, and further the determined start moment for scanning the receive beam should also be a predicted moment. Therefore, when really completing the synchronization of the high frequency frame, the user equipment should determine an accurate receive moment of the second high frequency frame, that is, the second moment.

Although the user equipment cannot learn of a moment at which the base station scans a transmit beam, and therefore cannot determine the receive moment of the high frequency frame, the user equipment can determine the receive moment of the low frequency frame, and further obtain the time difference between the receive moment of the high frequency frame and the receive moment of the low frequency frame, so that the user equipment can determine the start moment for scanning the corresponding receive beam, scan the receive beam at the start moment, and receive complete data, to implement the synchronization of the high frequency frame, and receive complete data. In addition, the user equipment can determine the accurate second moment at which the high frequency frame is received.

The time difference herein is an accurate receive time difference. After receiving the time difference, the base station delivers the time difference to another user equipment (user equipment belonging to a same cell coverage area as the user equipment), so that the another user equipment can also determine, according to this accurate receive time difference, an accurate moment for scanning a receive beam, and further complete synchronization of a high frequency frame.

According to the frame synchronization method in this embodiment of the present invention, the user equipment receives the low-frequency synchronization signal sent by the base station, determines, according to the low-frequency synchronization signal, the first moment at which the low frequency frame is received, obtains the receive time difference (that is, the time difference between the moment at which the user equipment receives the high frequency frame and the moment at which the user equipment receives the low frequency frame), determines, according to the receive time difference and the first moment, the start moment for scanning the corresponding receive beam, and receives the data transmitted by using the high frequency frame, to implement the synchronization of the high frequency frame. In addition, the user equipment determines the second moment at which the high frequency frame is received, and reports the time difference between the first moment and the second moment to a base station. In the prior art, the user equipment does not know when the base station scans a transmit beam, and therefore is uncertain about a synchronization point of the high frequency frame (that is, a receive moment of the high frequency frame) and cannot implement time synchronization between the user equipment and the base station, and the user equipment cannot receive complete data that is transmitted by using the high frequency frame. According to the method provided in the present invention, the user equipment can determine the receive moment of the high frequency frame, and further implement synchronization of the high frequency frame in the high-low frequency hybrid communications system, so that the user equipment can receive the complete data that is transmitted by using the high frequency frame.

Embodiment 3

Figure 9:
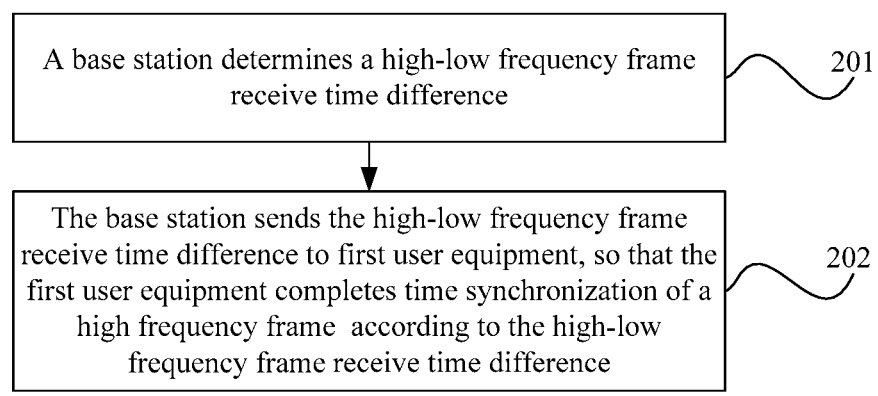
FIG. 9 is a schematic flowchart of a frame synchronization method according to Embodiment 3 of the present invention.

This embodiment of the present invention provides a frame synchronization method. As shown in FIG. 9, the method includes the following steps.

201. A base station determines a receive time difference.

The receive time difference is a time difference between a moment at which first user equipment receives a second frequency frame and a moment at which the first user equipment receives a first frequency frame. The first frequency frame may be a low frequency frame, and the second frequency frame is a high frequency frame.

During specific implementation, the base station may obtain the receive time difference in the following two manners.

1. The base station obtains a transmit time difference, where the transmit time difference is a time difference between a transmit moment of the second frequency frame and a transmit moment of the first frequency frame; and determines the receive time difference $\Delta$ according to $\Delta=(d_2-d_1)/c+\delta$.

In the foregoing formula, $d_2$ is a value of a transmission path on which the second frequency frame arrives at the first user equipment, $d_1$ is a value of a transmission path on which the first frequency frame arrives at the first user equipment, c is a speed of light, and $\delta$ is the transmit time difference.

2. The base station receives a time difference, reported by second user equipment, between a first moment at which the second user equipment receives the first frequency frame and a second moment at which the second user equipment completes synchronization of the second frequency frame; and determines the time difference as the receive time difference.

The second user equipment and the first user equipment belong to a same cell.

It should be noted that the receive time difference determined in the first manner is a predicted value. The user equipment may determine a moment according to the receive time difference and the receive moment of the first frequency frame, scan a receive beam at least before the moment, and receive complete data, to implement the synchronization of the second frequency frame. The receive time difference determined in the second manner is an accurate value. The user equipment may determine a moment according to a sum of the receive time difference and the receive moment of the first frequency frame, and scan a receive beam at the moment, to implement the synchronization of the second frequency frame.

202. The base station sends the receive time difference to the first user equipment, so that the first user equipment completes synchronization of a second frequency frame according to the receive time difference.

The base station in this embodiment of the present invention indicates the receive time difference to the user equipment, so that the user equipment determines, according to the receive time difference and the first moment, a start moment for scanning the corresponding receive beam, and receives the data transmitted by using the second frequency frame, to implement the synchronization of the second frequency frame. In addition, the user equipment determines the second moment at which the second frequency frame is received, to complete the synchronization of the second frequency frame. In the prior art, the user equipment does not know when the base station scans a transmit beam, and therefore is uncertain about a synchronization point of the second frequency frame and cannot implement time synchronization between the user equipment and the base station. According to the method provided in the present invention, the receive moment of the second frequency frame can be determined, so that synchronization (that is, time synchronization) of the second frequency frame is implemented in a high-low frequency hybrid communications system.

Embodiment 4

Figure 10:
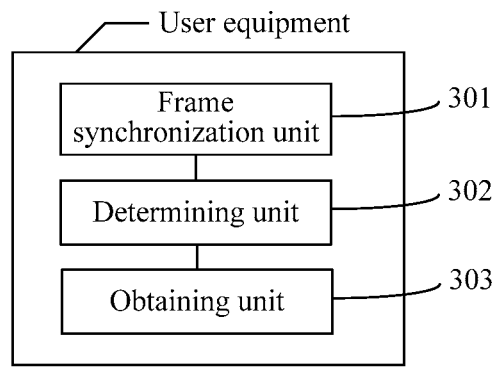
FIG. 10 is a structural block diagram of user equipment according to Embodiment 4 of the present invention.

This embodiment of the present invention provides user equipment. As shown in FIG. 10, the user equipment includes a frame synchronization unit 301, a determining unit 302, and an obtaining unit 303. The frame synchronization unit 301 is configured to complete synchronization of a first frequency frame. The user equipment supports first-frequency communication and second-frequency communication.

The determining unit 302 is configured to determine a first moment of the synchronization of the first frequency frame.

During specific implementation, a low-frequency synchronization signal sent by a base station may be received by using a receiving unit, the synchronization of the first frequency frame is implemented according to the low-frequency synchronization signal, and the first moment is determined.

The obtaining unit 303 is configured to obtain a receive time difference. The receive time difference is a time difference between a moment at which the user equipment receives a second frequency frame and a moment at which the user equipment receives a first frequency frame.

The frame synchronization unit 301 is configured to complete synchronization of the second frequency frame according to the receive time difference obtained by the obtaining unit and the first moment determined by the determining unit.

Figure 10A:
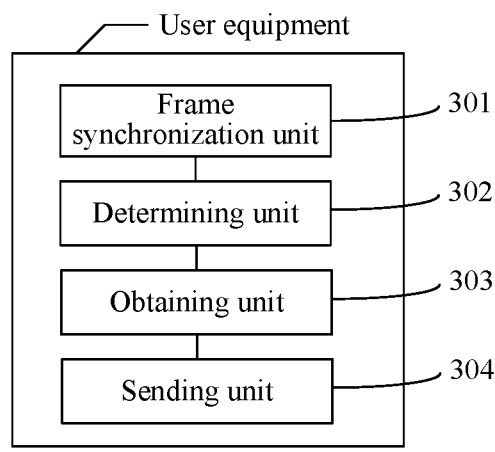
FIG. 10a is another structural block diagram of user equipment according to Embodiment 4 of the present invention.

As shown in FIG. 10a, the user equipment further includes a sending unit 304.

The determining unit 302 is further configured to: determine a second moment at which the synchronization of the second frequency frame is completed, and determine a time difference between the first moment and the second moment.

The sending unit 304 is configured to report the time difference between the first moment and the second moment to a base station.

The frame synchronization unit 301 is specifically configured to: determine, according to the receive time difference and the first moment, a start moment for scanning a receive beam corresponding to the second frequency frame, scan the receive beam at the start moment determined by the determining unit, and receive data sent by using the second frequency frame, to complete the synchronization of the second frequency frame.

The frame synchronization unit 301 is specifically configured to: determine a third moment according to a sum of the receive time difference and the first moment, and determine that the start moment is at least before the third moment.

The obtaining unit 303 is specifically configured to: receive time difference indication information sent by a base station, where the time difference indication information carries a transmit time difference, and the transmit time difference is a time difference between a transmit moment of the second frequency frame and a transmit moment of the first frequency frame; and calculate the receive time difference according to the transmit time difference.

The obtaining unit 303 is specifically configured to: determine the receive time difference $\Delta$ according to $\Delta=(d_2-d_1)/c+\delta$, where $d_2$ is a value of a transmission path on which the second frequency frame arrives at the user equipment, $d_1$ is a value of a transmission path on which the first frequency frame arrives at the user equipment, c is a speed of light, and $\delta$ is the transmit time difference.

The obtaining unit 303 is specifically configured to: receive scenario indication information delivered by the base station, determine a scenario of the user equipment according to the scenario indication information, and determine a value of $(d_2-d_1)$ according to the scenario of the user equipment.

The obtaining unit 303 is specifically configured to receive the receive time difference sent by user equipment in a same cell.

The obtaining unit 303 is specifically configured to receive the receive time difference sent by a base station.

The obtaining unit 303 is specifically configured to receive a time sequence number X sent by a base station, and determine an $X^{th}$ receive time difference in a pre-stored receive time difference table as the receive time difference.

The obtaining unit 303 is specifically configured to determine the receive time difference according to a pre-stored value range of the receive time difference.

It should be noted that a receiving function of the obtaining unit 303 may be implemented by using a receiver of the user equipment, and the sending unit 304 may be a transmitter of the user equipment, or the transmitter and the receiver are integrated as a transceiver. The determining unit 302, the obtaining unit 303, and the frame synchronization unit 301 may be integrated into a processor of the user equipment for implementation, or may be stored in a memory of the user equipment in a form of program code. The processor of the user equipment invokes the code stored in the memory of the user equipment, to execute the foregoing functions of the determining unit 302, the obtaining unit 303, and the frame synchronization unit 301.

The user equipment in this embodiment of the present invention receives the low-frequency synchronization signal sent by the base station, determines, according to the low-frequency synchronization signal, the first moment at which the first frequency frame is received, obtains the receive time difference (that is, the time difference between the moment at which the user equipment receives the second frequency frame and the moment at which the user equipment receives the first frequency frame), determines, according to the receive time difference and the first moment, the start moment for scanning the corresponding receive beam, and receives data transmitted by using the second frequency frame, to implement the synchronization of the second frequency frame. In addition, the user equipment determines the second moment at which the second frequency frame is received, to complete the synchronization of the second frequency frame. In the prior art, the user equipment does not know when the base station scans a transmit beam, and therefore is uncertain about a synchronization point of the second frequency frame and cannot implement time synchronization between the user equipment and the base station. According to the method provided in the present invention, the receive moment of the second frequency frame can be determined, so that time synchronization of the second frequency frame is implemented in a high-low frequency hybrid communications system.

Embodiment 5

Figure 11:
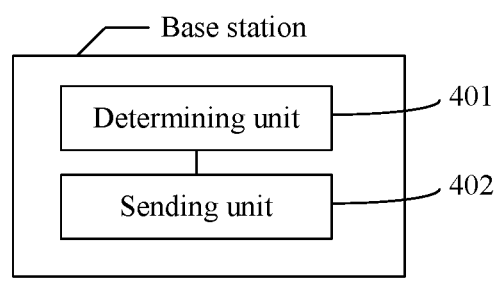
FIG. 11 is a structural block diagram of a base station according to Embodiment 5 of the present invention.

This embodiment of the present invention provides a base station, including a determining unit 401 and a sending unit 402, as shown in FIG. 11.

The determining unit 401 is configured to determine a receive time difference, where the receive time difference is a time difference between a moment at which first user equipment receives a second frequency frame and a moment at which the first user equipment receives a first frequency frame.

The sending unit 402 is configured to send the receive time difference to the first user equipment, so that the first user equipment completes synchronization of the second frequency frame according to the receive time difference.

The determining unit 401 is specifically configured to: obtain a transmit time difference, where the transmit time difference is a time difference between a transmit moment of the second frequency frame and a transmit moment of the first frequency frame; and determine the receive time difference $\Delta$ according to $\Delta=(d_2-d_1)/c+\delta$, where $d_2$ is a value of a transmission path on which the second frequency frame arrives at the first user equipment, $d_1$ is a value of a transmission path on which the first frequency frame arrives at the first user equipment, c is a speed of light, and $\delta$ is the transmit time difference.

Figure 11A:
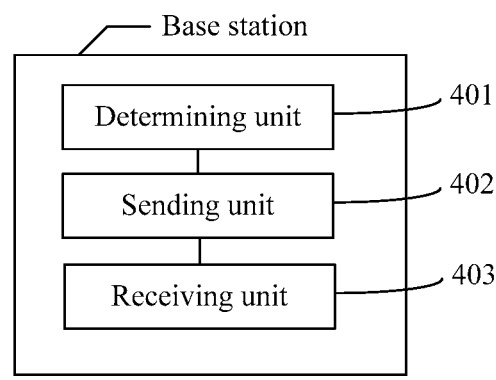

As shown in FIG. 11a, the base station further includes a receiving unit 403.

The receiving unit is configured to receive a difference, reported by the user equipment, between the first moment and the second moment.

It should be noted that the receiving unit 403 may be a receiver of the base station, and the sending unit 402 may be a transmitter of the base station, or the transmitter and the receiver are integrated as a transceiver. The determining unit 401 may be integrated into a processor of the base station for implementation, or may be stored in a memory of the base station in a form of program code. The processor invokes the code stored in the memory, to execute the foregoing functions of the determining unit 401.

The base station in this embodiment of the present invention indicates the receive time difference to the user equipment, so that the user equipment determines, according to the receive time difference and the first moment, a start moment for scanning a corresponding receive beam, and receives data transmitted by using the second frequency frame, to implement the synchronization of the second frequency frame, and determines the second moment at which the second frequency frame is received, to complete the synchronization of the second frequency frame. In the prior art, the user equipment does not know when the base station scans a transmit beam, and therefore is uncertain about a synchronization point of the second frequency frame and cannot implement time synchronization between the user equipment and the base station. According to the method provided in the present invention, the receive moment of the second frequency frame can be determined, so that time synchronization of the second frequency frame is implemented in a high-low frequency hybrid communications system.

Embodiment 6

Figure 12:
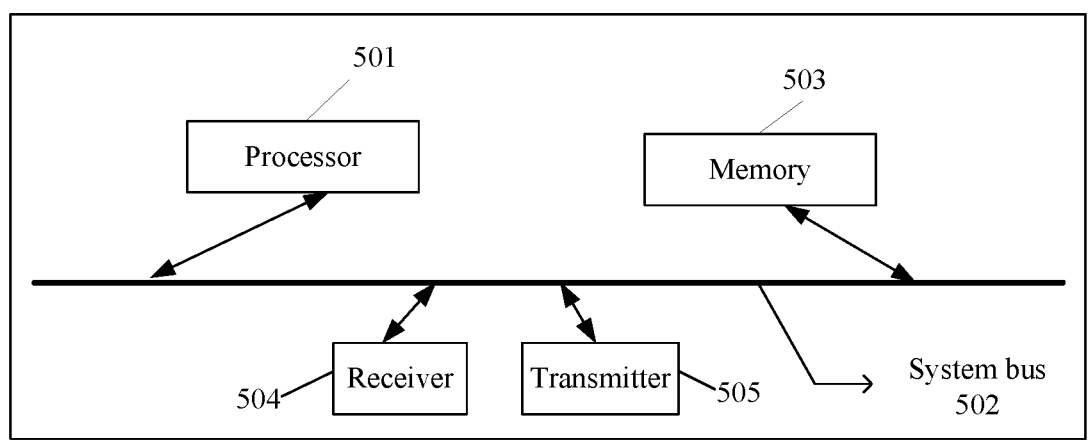
FIG. 12 is a structural block diagram of user equipment according to Embodiment 6 of the present invention.

This embodiment of the present invention provides user equipment. As shown in FIG. 12, the user equipment includes a processor 501, a system bus 502, a memory 503, a receiver 504, and a transmitter 505.

The processor 501 may be a central processing unit (English: central processing unit, CPU for short).

The memory 503 is configured to store program code and transmit the program code to the processor 501. The processor 501 executes instructions according to the program code. The memory 503 may include a volatile memory (English: volatile memory), for example, a random access memory (English: random access memory, RAM for short). The memory 503 may include a nonvolatile memory (English: nonvolatile memory), for example, a read-only memory (English: read-only memory, ROM for short), a flash memory (English: flash memory), a hard disk drive (English: hard disk drive, HDD for short), or a solid-state drive (English: solid-state drive, SSD for short). The memory 503 may alternatively include a combination of the foregoing types of memories. The processor 501 and the memory 503 are connected and communicate with each other by using the system bus 502.

The receiver 504 may be implemented by using an optical receiver, an electrical receiver, a radio receiver, or any combination thereof. For example, the optical receiver may be a small form-factor pluggable (English: small form-factor pluggable, SFP for short) receiver (English: transceiver), an enhanced small form-factor pluggable (English: enhanced small form-factor pluggable, SFP+ for short) receiver, or a 10 gigabit small form-factor pluggable (English: 10 Gigabit small form-factor pluggable, XFP for short) receiver. The electrical receiver may be an Ethernet (English: Ethernet) network interface controller (English: network interface controller, NIC for short). The radio receiver may be a wireless network interface controller (English: wireless network interface controller, WNIC for short).

The transmitter 505 may be implemented by using an optical transmitter, an electrical transmitter, a radio transmitter, or any combination thereof. For example, the optical transmitter may be a small form-factor pluggable transmitter, an enhanced small form-factor pluggable transmitter, or a 10 gigabit small form-factor pluggable transmitter. The electrical transmitter may be an Ethernet network interface controller. The radio transmitter may be a wireless network interface controller.

The processor 501 is configured to: complete synchronization of a first frequency frame; determine a first moment of the synchronization of the first frequency frame; obtain a receive time difference, where the receive time difference is a time difference between a moment at which the user equipment receives a second frequency frame and a moment at which the user equipment receives the first frequency frame; and complete synchronization of the second frequency frame according to the receive time difference and the first moment.

The processor 501 is further configured to: determine a second moment at which the synchronization of the second frequency frame is completed, and determine a time difference between the first moment and the second moment.

The transmitter 505 is configured to report the time difference between the first moment and the second moment to a base station.

The processor 501 is specifically configured to: determine, according to the receive time difference and the first moment, a start moment for scanning a receive beam corresponding to the second frequency frame, scan the receive beam at the start moment determined by the processor 501, and receive data sent by using the second frequency frame, to complete the synchronization of the second frequency frame.

The processor 501 is specifically configured to: determine a third moment according to a sum of the receive time difference and the first moment, and determine that the start moment is at least before the third moment.

The receiver 504 is specifically configured to: receive time difference indication information sent by a base station, where the time difference indication information carries a transmit time difference, and the transmit time difference is a time difference between a transmit moment of the second frequency frame and a transmit moment of the first frequency frame; and calculate the receive time difference according to the transmit time difference.

The processor 501 is specifically configured to:
determine the receive time difference $\Delta$ according to $\Delta=(d_2-d_1)/c+\delta$, where $d_2$ is a value of a transmission path on which the second frequency frame arrives at the user equipment, $d_1$ is a value of a transmission path on which the first frequency frame arrives at the user equipment, c is a speed of light, and $\delta$ is the transmit time difference.

The receiver 504 is specifically configured to receive the receive time difference sent by user equipment in a same cell.

The receiver 504 is specifically configured to receive the receive time difference sent by a base station.

The receiver 504 is specifically configured to receive a time sequence number X sent by a base station, and determine an $X^{th}$ receive time difference in a pre-stored receive time difference table as the receive time difference.

The user equipment in this embodiment of the present invention receives a low-frequency synchronization signal sent by the base station, determines, according to the low-frequency synchronization signal, the first moment at which the first frequency frame is received, obtains the receive time difference (that is, the time difference between the moment at which the user equipment receives the second frequency frame and the moment at which the user equipment receives the first frequency frame), determines, according to the receive time difference and the first moment, the start moment for scanning the corresponding receive beam, receives data transmitted by using the second frequency frame, to implement the synchronization of the second frequency frame. In addition, the user equipment determines the second moment at which the second frequency frame is received, to complete the synchronization of the second frequency frame. In the prior art, the user equipment does not know when the base station scans a transmit beam, and therefore is uncertain about a synchronization point of the second frequency frame and cannot implement time synchronization between the user equipment and the base station. According to the method provided in the present invention, the receive moment of the second frequency frame can be determined, so that time synchronization of the second frequency frame is implemented in a high-low frequency hybrid communications system.

Embodiment 7

Figure 13:
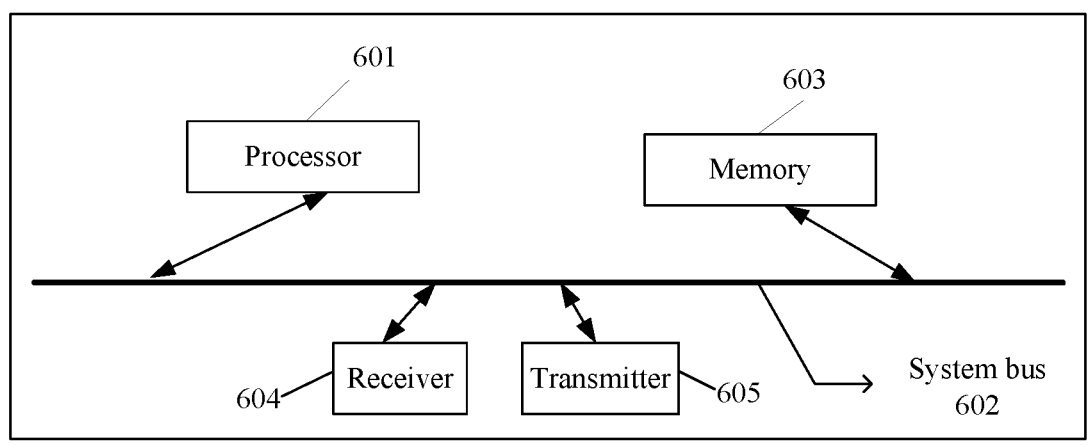
FIG. 13 is a structural block diagram of a base station according to Embodiment 7 of the present invention.

This embodiment of the present invention provides a base station. As shown in FIG. 13, the base station includes a processor 601, a system bus 602, a memory 603, a receiver 604, and a transmitter 605.

The processor 601 may be a central processing unit.

The memory 603 is configured to store program code and transmit the program code to the processor 601. The processor 601 executes instructions according to the program code. The memory 603 may include a volatile memory, for example, a random access memory. The memory 603 may include a nonvolatile memory, for example, a read-only memory, a flash memory, a hard disk, or a solid-state drive. The memory 603 may alternatively include a combination of the foregoing types of memories. The processor 601 and the memory 603 are connected and communicate with each other by using the system bus 602.

The receiver 604 may be implemented by using an optical receiver, an electrical receiver, a radio receiver, or any combination thereof. For example, the optical receiver may be a small form-factor pluggable receiver, an enhanced small form-factor pluggable receiver, or a 10 gigabit small form-factor pluggable receiver. The electrical receiver may be an Ethernet network interface controller. The radio receiver may be a wireless network interface controller.

The transmitter 605 may be implemented by using an optical transmitter, an electrical transmitter, a radio transmitter, or any combination thereof. For example, the optical transmitter may be a small form-factor pluggable transmitter, an enhanced small form-factor pluggable transmitter, or a 10 gigabit small form-factor pluggable transmitter. The electrical transmitter may be an Ethernet network interface controller. The radio transmitter may be a wireless network interface controller.

The processor 601 is configured to determine a receive time difference, where the receive time difference is a time difference between a moment at which first user equipment receives a second frequency frame and a moment at which the first user equipment receives a first frequency frame.

The transmitter 605 is configured to send the receive time difference to the first user equipment, so that the first user equipment completes synchronization of the second frequency frame according to the receive time difference.

The processor 601 is specifically configured to: obtain a transmit time difference, where the transmit time difference is a time difference between a transmit moment of the second frequency frame and a transmit moment of the first frequency frame; and
determine the receive time difference $\Delta$ according to $\Delta=(d_2-d_1)/c+\delta$, where $d_2$ is a value of a transmission path on which the second frequency frame arrives at the first user equipment, $d_1$ is a value of a transmission path on which the first frequency frame arrives at the first user equipment, c is a speed of light, and δ is the transmit time difference.

The receiver 604 is configured to receive a time difference, reported by second user equipment, between a first moment at which the second user equipment receives the first frequency frame and a second moment at which the second user equipment completes synchronization of the second frequency frame, where the second user equipment and the first user equipment belong to a same cell.

The processor 601 is specifically configured to determine the time difference as the receive time difference.

The base station in this embodiment of the present invention indicates the receive time difference to the user equipment, so that the user equipment determines, according to the receive time difference and a first moment, a start moment for scanning a corresponding receive beam, and receives data transmitted by using the second frequency frame, to implement the synchronization of the second frequency frame. In addition, the user equipment determines a second moment at which the second frequency frame is received, to complete the synchronization of the second frequency frame. In the prior art, the user equipment does not know when the base station scans a transmit beam, and therefore is uncertain about a synchronization point of the second frequency frame and cannot implement time synchronization between the user equipment and the base station. According to the method provided in the present invention, the receive moment of the second frequency frame can be determined, so that time synchronization of the second frequency frame is implemented in a high-low frequency hybrid communications system.

The foregoing descriptions about implementations allow a person skilled in the art to clearly understand that, for the purpose of convenient and brief description, merely division of the foregoing function modules is used as an example for illustration. During actual application, the foregoing functions can be allocated to different modules for implementation according to a requirement, that is, an inner structure of an apparatus is divided into different function modules to implement all or some of the functions described above. For a detailed working process of the foregoing apparatus, refer to a corresponding process in the foregoing method embodiments, and details are not described herein again.

The units described as separate parts may or may not be physically separate, and parts displayed as units may be one or more physical units, that is, may be located in one place, or may be distributed on different places. Some or all of the units may be selected according to an actual requirement to achieve the objectives of the solutions in the embodiments. In addition, function units in the embodiments of the present invention may be integrated into one processing unit, or each of the units may exist alone physically, or two or more units are integrated into one unit. The integrated unit may be implemented in a form of hardware, or may be implemented in a form of a software function unit.

When the integrated unit is implemented in the form of a software function unit and sold or used as an independent product, the integrated unit may be stored in a readable storage medium. Based on such an understanding, the technical solutions in the present invention essentially, or the part contributing to the prior art, or all or some of the technical solutions may be implemented in the form of a software product. The software product is stored in a storage medium and includes several instructions for instructing a device (which may be a single-chip microcomputer, a chip, or the like) or a processor (processor) to perform all or some of the steps of the methods described in the embodiments of the present invention. The foregoing storage medium includes: any medium that can store program code, such as a USB flash drive, a removable hard disk, a read-only memory (ROM, Read-Only Memory), a random access memory (RAM, Random Access Memory), a magnetic disk, or an optical disc.

The foregoing descriptions are merely specific implementations of the present invention, but are not intended to limit the protection scope of the present invention. Any variation or replacement readily figured out by a person skilled in the art within the technical scope disclosed in the present invention shall fall within the protection scope of the present invention. Therefore, the protection scope of the present invention shall be subject to the protection scope of the claims.

What is claimed is:

1. A frame synchronization method, comprising:
   completing, by a user equipment, synchronization of a first frequency frame; and
   after completing the synchronization of the first frequency frame:
   determining, by the user equipment, a first moment of the synchronization of the first frequency frame, wherein the user equipment supports communication in the first frequency and communication in a second frequency;
   obtaining, by the user equipment, a receive time difference, wherein the receive time difference is a time difference between a moment at which the user equipment receives a second frequency frame and a moment at which the user equipment receives the first frequency frame; and
   completing, by the user equipment, synchronization of the second frequency frame according to the obtained receive time difference and the determined first moment.

2. The method according to claim 1, wherein after the completing, by the user equipment, synchronization of the second frequency frame according to the obtained receive time difference and the determined first moment, the method further comprises:
   determining, by the user equipment, a second moment of the synchronization of the second frequency frame;
   determining, by the user equipment, a time difference between the first moment and the second moment; and
   reporting the time difference between the first moment and the second moment to a base station.

3. The method according to claim 1, wherein the completing, by the user equipment, synchronization of the second frequency frame according to the obtained receive time difference and the determined first moment comprises:
   determining, according to the obtained receive time difference and the determined first moment, a start moment for scanning a receive beam corresponding to the second frequency frame;
   scanning the receive beam at the start moment; and
   receiving data, sent through the second frequency frame, to complete the synchronization of the second frequency frame.

4. The method according to claim 3, wherein the determining, according to the obtained receive time difference and the determined first moment, a start moment for scanning a receive beam corresponding to the second frequency frame comprises:

determining, by the user equipment, a third moment according to a sum of the obtained receive time difference and the determined first moment; and determining, by the user equipment, that the start moment is at least before the determined third moment.

5. The method according to claim 1, wherein the obtaining, by the user equipment, a receive time difference comprises:

receiving time difference indication information sent by a base station, wherein the time difference indication information carries a transmit time difference, and the transmit time difference is a time difference between a transmit moment of the second frequency frame and a transmit moment of the first frequency frame; and calculating the receive time difference according to the received transmit time difference.

6. The method according to claim 5, wherein the calculating the receive time difference according to the received transmit time difference comprises:

determining the receive time difference $\Delta$ according to $\Delta=(d_2-d_1)/c+\delta$, wherein $d_2$, is a value of a transmission path on which the second frequency frame arrives at the user equipment, $d_1$ is a value of a transmission path on which the first frequency frame arrives at the user equipment, c is speed of light, and $\delta$ is the received transmit time difference.

7. The method according to claim 6, wherein the method further comprises:

receiving scenario indication information sent by the base station;

determining a scenario of the user equipment according to the scenario indication information; and determining a value of $(d_2-d_1,)$ according to the scenario of the user equipment.

8. The method according to claim 1, wherein the obtaining, by the user equipment, a receive time difference comprises at least one of:

receiving the receive time difference sent by a second user equipment in a same cell of the user equipment;

receiving the receive time difference sent by a base station;

receiving a time sequence number X sent by a base station, and determining an $X^{th}$ receive time difference in a pre-stored receive time difference table as the receive time difference, wherein N different receive time differences are recorded in the receive time difference table, and N is an integer greater than or equal to 1; and determining the receive time difference according to a pre-stored value range of the receive time difference.

9. A frame synchronization method, comprising:

determining, by a base station, a receive time difference, wherein the receive time difference is a time difference between a moment at which a first user equipment receives a second frequency frame and a moment at which the first user equipment receives a first frequency frame; and sending, by the base station, the receive time difference to the first user equipment, so that the first user equipment completes synchronization of the second frequency frame according to the receive time difference and a moment at which the first user equipment completes synchronization of the first frequency frame.

10. The method according to claim 9, wherein the determining, by a base station, a receive time difference comprises at least one of:

obtaining, by the base station, a transmit time difference, wherein the transmit time difference is a time difference between a transmit moment of the second frequency frame and a transmit moment of the first frequency frame, and determining the receive time difference $\Delta$ according to $\Delta=(d_2-d_1)/c+\delta$, wherein $d_2$ is a value of a transmission path on which the second frequency frame arrives at the user equipment, $d_1$ is a value of a transmission path on which the first frequency frame arrives at the user equipment, c is speed of light, and $\delta$ is the transmit time difference;

and receiving a time difference, reported by a second user equipment, between a first moment at which the second user equipment completes synchronization of the first frequency frame and a second moment at which the second user equipment completes synchronization of the second frequency frame, wherein the second user equipment and the first user equipment belong to a same cell, and determining the time difference as the receive time difference.

11. A user equipment, wherein the user equipment supports communication in a first frequency and communication in a second frequency, comprises:

at least one processor, the at least one processor configured to:

complete synchronization of a first frequency frame; and determine a first moment at which the user equipment completes the synchronization of the first frequency frame; and a receiver, the receiver configured to obtain a receive time difference, wherein the receive time difference is a time difference between a moment at which the user equipment receives a second frequency frame and a moment at which the user equipment receives the first frequency frame, and wherein after completing the synchronization of the first frequency frame, the at least one processor is further configured to complete synchronization of the second frequency frame according to the receive time difference and the first moment.

12. The user equipment according to claim 11, wherein the at least one processor is further configured to:

determine a second moment at which the synchronization of the second frequency frame is completed; and determine a time difference between the first moment and the second moment; and the user equipment further comprising:

a transmitter, the transmitter configured to report the time difference between the first moment and the second moment to a base station.

13. The user equipment according to claim 11, wherein the at least one processor is further configured to determine, according to the receive time difference and the first moment, a start moment for scanning a receive beam corresponding to the second frequency frame; and the receiver is further configured to:

scan the receive beam at the start moment; and receive data, sent through the second frequency frame, to complete the synchronization of the second frequency frame.

14. The user equipment according to claim 13, wherein the at least one processor is configured to:

determine a third moment according to a sum of the receive time difference and the first moment; and determine that the start moment is at least before the third moment.

15. The user equipment according to claim 11, wherein:
the receiver is configured to receive time difference indication information sent by a base station, wherein the time difference indication information carries a transmit time difference, and the transmit time difference is a time difference between a transmit moment of the second frequency frame and a transmit moment of the first frequency frame; and
the at least one processor is further configured to calculate the receive time difference according to the transmit time difference.

16. The user equipment according to claim 15, wherein the at least one processor is configured to:
determine the receive time difference $\Delta$ according to $\Delta=(d_2 -d_1)/c+\delta$, wherein $d_2$ is a value of a transmission path on which the second frequency frame arrives at the user equipment, $d_1$ is a value of a transmission path on which the first frequency frame arrives at the user equipment, c is speed of light, and $\delta$ is the transmit time difference.

17. The user equipment according to claim 11, wherein the receiver is configured to at least one of:
receive the receive time difference sent by a second user equipment in a same cell od the user equipment;
receive the receive time difference sent by a base station; and
receive a time sequence number X sent by a base station, and determine an $X^{th}$ receive time difference in a pre-stored receive time difference table as the receive time difference, wherein N different receive time differences are recorded in the receive time difference table, and N is an integer greater than or equal to 1; or
the at least one processor is further configured to determine the receive time difference according to a pre-stored value range of the receive time difference.

18. A base station, comprising:
at least one processor, the at least one processor configured to determine a receive time difference, wherein the receive time difference is a time difference between a moment at which a first user equipment receives a second frequency frame and a moment at which the first user equipment receives a first frequency frame; and
a transmitter, the transmitter configured to send the receive time difference to the first user equipment, so that the first user equipment completes synchronization of the second frequency frame according to the receive time difference and a moment at which the first user equipment completes synchronization of the first frequency frame.

19. The base station according to claim 18, wherein the at least one processor is configured to:
obtain a transmit time difference, wherein the transmit time difference is a time difference between a transmit moment of the second frequency frame and a transmit moment of the first frequency frame; and
determine the receive time difference $\Delta$ according to $\Delta=(d_2 -d_1)/c+\delta$, wherein $d_2$ is a value of a transmission path on which the second frequency frame arrives at the first user equipment, $d_1$ is a value of a transmission path on which the first frequency frame arrives at the first user equipment, c is speed of light, and $\delta$ is the transmit time difference.

20. The base station according to claim 18, further comprising a receiver, wherein
the receiver is configured to receive a time difference, reported by a second user equipment, between a first moment at which the second user equipment receives the first frequency frame and a second moment at which the second user equipment completes synchronization of the second frequency frame, wherein the second user equipment and the first user equipment belong to a same cell; and
the at least one processor is configured to determine the time difference as the receive time difference.

* * * * *

UNITED STATES PATENT AND TRADEMARK OFFICE
CERTIFICATE OF CORRECTION

PATENT NO. : 10,681,657 B2
APPLICATION NO. : 16/009486
DATED : June 9, 2020
INVENTOR(S) : Huang Huang, Yi Wang and Lei Huang Page 1 of 1

It is certified that error appears in the above-identified patent and that said Letters Patent is hereby corrected as shown below:

In the Claims

In Column 27, Line 34, in Claim 7, delete "$(d_2-d_1,)$" and insert -- $(d_2-d_1)$ --, therefor.

Signed and Sealed this
Eighth Day of December, 2020

Andrei Iancu
*Director of the United States Patent and Trademark Office*